Dec. 29, 1953 E. L. APPLEBY 2,664,285
FRICTION REDUCING APPARATUS FOR GOVERNOR SPINDLES
Filed Oct. 13, 1948
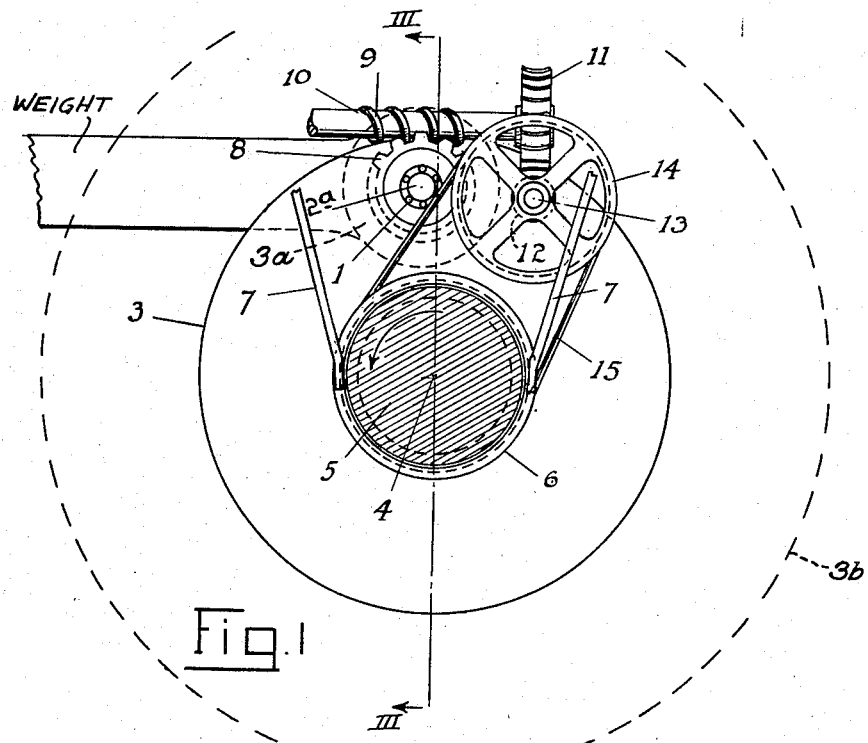
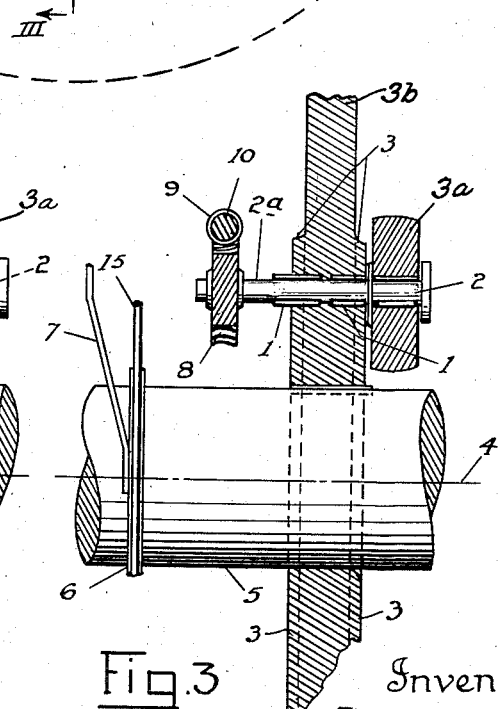
Inventor
Elmer L. Appleby
By W.S.F. Miller
ATTORNEY Patented Dec. 29, 1953

2,664,285

UNITED STATES PATENT OFFICE 2,664,285

FRICTION REDUCING APPARATUS FOR GOVERNOR SPINDLES

Elmer L. Appleby, Calgary, Alberta, Canada

Application October 13, 1948, Serial No. 54,265

2 Claims. (Cl. 264—1)

This invention relates to friction reducing apparatus for the spindle of a parallel pivot type governor. The objects of the invention are to provide the governor with roller bearings around the axially offset spindle or suspension pin which is conventionally disposed in the hub portion of the wheel of the governor, together with belt driven coordinating gearing means to rotate this spindle at a slow rate of speed compared with the revolutions of the governor shaft.

The principal advantage in my improvement is that there is a more even wearing effect on the spindle, or suspension pin as this is more commonly referred to, and around its bearing, than is conventionally the case, when there is invariably a tendency to wear unevenly between these surfaces due to the centrifugal action on the spindle and its bearing about the main axis of the governor and its mounting wheel.

The above mentioned advantage is considerable when it is considered that an unevenly worn suspension pin will seriously affect the accuracy of the governor and the consequent efficiency of the power-producing unit controlled by the governor.

The following specification of this apparatus is accompanied by a drawing of same in which similar numerals refer to similar parts throughout the different views.

Fig. 1 is an end view of the apparatus and with the governor shaft in cross section, the bearing of the worm gear being omitted.

Fig. 2 is a side view of Fig. 1 showing a fragmented portion of the governor weight, governor wheel and hub, and the governor weight in part section.

Fig. 3 is a sectional view taken substantially along the line III—III of Fig. 1.

Referring to the drawing, the numeral 1 denotes antifriction rollers supporting an offset spindle or suspension pin 2 of a governor, as indicated particularly by its hub 3.

In this invention I am not concerned particularly with any certain type of governor except that it comprises a centrifugally influenced weight 3a mounted pivotally on an arm within the revolvable rim of the governor wheel 3b. The rollers 1 are associated with the pin 2 and the weight 3a as bearing elements. The said suspension pin 2 is in eccentric relationship with the axis 4 of the governor wheel shaft 5. A pulley 6 is concentrically disposed around the shaft 5, on which shaft the complete governor apparatus is mounted for its rotation.

The pulley 6 is held in non-rotative position as it bears on the rotatable shaft 5 by means of bracket arms 7 depending from a suitable part of an engine frame. The rotatable suspension pin 2 has a gear 8 mounted on its extended end 2a, which gear meshes with a worm 9 on the cross spindle 10 whose support is not shown. On the near end of this spindle 10, as viewed in Fig. 2, is another gear 11 as shown in Figs. 1 and 2. This gear 11 meshes with a worm 12 mounted axially parallel with the shaft 5 and spindle 2, the worm being on a sleeve 12a mounted rotatably on a spindle 13 axially parallel with the said spindle 2, the spindle 13 being screwably fitted into the hub 3 of the governor wheel.

The arm shown in Fig. 1 is an integral part of the weight 3a seen in Figs. 2 and 3, and this arm rotates with the governor wheel, being pivotally suspended on the pin 2. Centrifugal force causes movement of this arm, and it is on account of such movement about the pin 2 that the rollers are introduced in order to reduce friction between the pin 2 and the weighted arm 3a. The free movement of this arm on its spindle is the all-important feature of this governor mechanism, since it controls the variations in the length of throw of an eccentric and valve combination regulating engine speed.

A pulley 14 is mounted on this fixed spindle 13 to rotate with the said sleeve 12a, which pulley is belt-coupled with the said pulley 6 by a belt 15. The whole governor assembly rotates with its shaft 5 around the axis 4, while the pulley 6 remains stationary in relation thereto on account of its holding brackets 7. Consequently the pulley belt turns the pulley 14 rotatively to motivate the worm 12, the gear 11, and the worm 9 and its spindle 10, reducing the speed of the spindle to very slow, in comparison with the conventional speed.

The introduction of this slowly rotating roller-journaled spindle 2 is the object of my invention. The very slow rotation provides continuously new surfaces between the rollers 1 and their contacting spindle or suspension pin 2. In conventional governors it is found that worn grooves appear in the sleeve of the usual suspension part, whereas in my invention this slow turning spindle eliminates this grooving.

What I claim and desire to secure by Letters Patent is:

1. Apparatus to reduce uneven wear of a suspension pin mounting the weight of a rotatable power or speed-controlling governor, comprising a governor wheel and its integral hub, a rotatable governor wheel shaft driving said governor wheel, a suspension pin passing through said hub and axially parallel with said shaft, rollers inserted in the hub of the wheel and enclosing the said suspension pin, means to rotate the pin and its rollers at a very slow rate of speed compared with that of the governor shaft, said means including a train of reduction gears disposed adjacently between the governor wheel and its shaft, a stationary pulley spacedly encircling said shaft, a second pulley associated with said train of gears rotatable around and spacedly from said stationary pulley and belt-connected therewith, to rotatively motivate the said suspension pin by means of said train of gears.

2. Apparatus to reduce the wear between the weight-suspension pin of a governor and the bearing within the associated governor wheel weight of a centrifugal power-controlling wheel type governor, comprising in combination a governor wheel and its integral hub, a shaft carrying and driving said wheel and hub, a governor weight associated with said wheel and hub, a suspension pin for said weight axially parallel with said shaft and associated with said wheel and hub, a set of anti-friction rollers inserted into the hub of the wheel and into the said weight to journal the said pin, a threaded spindle screwed into the governor wheel hub and aligned parallel with the said wheel shaft and spaced therefrom, a sleeve rotatable on said spindle, a worm formed on said sleeve, a wormed spindle perpendicular to said threaded spindle and mounted so as to rotate with the governor wheel, a gear on said wormed spindle meshing with said worm on said sleeve, a gear on said suspension pin meshing with said wormed spindle, a stationary pulley encircling the said governor wheel shaft, a pulley integral with said sleeve, and a belt drivingly connecting together said pulleys to rotate the suspension pin through said gears and worms at a slower speed than that of the rotating governor wheel and shaft.

ELMER L. APPLEBY.

References Cited in the file of this patent

UNITED STATES PATENTS

| Number | Name | Date |
|---|---|---|
| 1,904,319 | Maroff | Apr. 18, 1933 |
| 2,269,351 | Barrish | Jan. 6, 1942 |

FOREIGN PATENTS

| Number | Country | Date |
|---|---|---|
| 26,592 | Great Britain | Dec. 6, 1904 |